(12) United States Patent
Bremer et al.

(10) Patent No.: US 12,122,288 B2
(45) Date of Patent: Oct. 22, 2024

(54) SURROUNDINGS ILLUMINATION DEVICE FOR A MOTOR VEHICLE

(71) Applicant: Bayerische Motoren Werke Aktiengesellschaft, Munich (DE)

(72) Inventors: Christopher Bremer, Augsburg (DE); Vincent Vogt, Munich (DE); Marc De Wille, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/910,196

(22) PCT Filed: Feb. 26, 2021

(86) PCT No.: PCT/EP2021/054889
§ 371 (c)(1),
(2) Date: Sep. 8, 2022

(87) PCT Pub. No.: WO2021/180492
PCT Pub. Date: Sep. 16, 2021

(65) Prior Publication Data
US 2023/0129730 A1    Apr. 27, 2023

(30) Foreign Application Priority Data

Mar. 9, 2020    (DE) .................... 10 2020 106 299.0

(51) Int. Cl.
*B60Q 1/24*     (2006.01)
*F21S 41/141*   (2018.01)
(Continued)

(52) U.S. Cl.
CPC ............ *B60Q 1/247* (2022.05); *F21S 41/141* (2018.01); *F21S 41/265* (2018.01); *B60Q 1/323* (2013.01);
(Continued)

(58) Field of Classification Search
CPC .. B60Q 2400/40; B60Q 2400/50; B60Q 1/24; B60Q 1/247; B60Q 1/323; B60Q 1/381;
(Continued)

(56) References Cited

U.S. PATENT DOCUMENTS 9,849,829 B1 * 12/2017 Salter ...................... F21S 43/26
11,982,419 B2 * 5/2024 Kang .................. F21S 43/2605
(Continued)

FOREIGN PATENT DOCUMENTS

DE     10 2009 024 894 A1    12/2010
DE     10 2011 076 083 A1    11/2012
(Continued)

OTHER PUBLICATIONS

International Search Report (PCT/ISA/210) issued in PCT Application No. PCT/EP2021/054889 dated Jun. 7, 2021 with English translation (seven (7) pages).
(Continued)

*Primary Examiner* — Zheng Song
(74) *Attorney, Agent, or Firm* — Crowell & Moring LLP

(57) ABSTRACT

A surroundings illumination device for illuminating the ground in the surroundings of a motor vehicle contains a controller for controlling the illumination of the ground and a projection module which includes a light device having a plurality of illuminants and an array of projection optics, a respective projection optic containing an associated object structure and an associated projection lens. The array of projection optics includes a plurality of sub-arrays which can be separately illuminated with an illuminant of the light device allocated to the respective sub-array, as a result of which, a partial graphic is generated on the ground in the surroundings of the vehicle by projection of the associated object structures of the projection optics of the respective sub-array.

18 Claims, 6 Drawing Sheets

(51) Int. Cl.
*F21S 41/265* (2018.01)
*B60Q 1/32* (2006.01)
*F21W 102/40* (2018.01)

(52) U.S. Cl.
CPC ...... *B60Q 2400/50* (2013.01); *B60Q 2900/40* (2022.05); *F21W 2102/40* (2018.01)

(58) Field of Classification Search
CPC ............ F21W 2103/60; F21W 2102/40; F21S 41/265; F21S 43/50; F21S 43/14; F21S 43/25; F21S 43/65; F21S 43/663
See application file for complete search history.

(56) References Cited

U.S. PATENT DOCUMENTS

| | | | |
|---|---|---|---|
| 2011/0228231 A1 | 9/2011 | Schreiber et al. | |
| 2014/0146290 A1 | 5/2014 | Sieler et al. | |
| 2014/0320823 A1 | 10/2014 | Ammar et al. | |
| 2015/0138794 A1* | 5/2015 | Salter ..................... | B60Q 1/325 |
| | | | 362/510 |
| 2015/0252975 A1* | 9/2015 | Nakada ................. | F21S 41/265 |
| | | | 362/521 |
| 2016/0018081 A1* | 1/2016 | Kadoriku ................ | F21S 41/43 |
| | | | 362/280 |
| 2016/0059771 A1* | 3/2016 | Meinzer ............... | B60Q 1/2696 |
| | | | 362/520 |
| 2017/0050558 A1* | 2/2017 | Salter ..................... | B60Q 1/323 |
| 2017/0190285 A1* | 7/2017 | Gocke ................. | G03B 21/001 |
| 2017/0241606 A1* | 8/2017 | Courcier ................ | F21S 41/25 |
| 2018/0236929 A1* | 8/2018 | Gocke .................. | F21S 41/143 |
| 2018/0361915 A1 | 12/2018 | Kuhl et al. | |
| 2019/0322209 A1* | 10/2019 | Sugiyama ............... | F21S 43/26 |
| 2021/0046863 A1* | 2/2021 | Weber .................. | B60Q 1/2615 |
| 2021/0197713 A1* | 7/2021 | Miao ...................... | B60Q 1/323 |
| 2021/0262634 A1* | 8/2021 | Lim ........................ | F21S 41/43 |
| 2021/0300238 A1* | 9/2021 | Latsch ................... | B60Q 1/507 |
| 2021/0388964 A1* | 12/2021 | Schadenhofer ......... | F21S 43/14 |
| 2022/0068056 A1* | 3/2022 | Weber .................. | G07C 5/0825 |
| 2023/0047462 A1* | 2/2023 | Bushre .................... | F21V 5/045 |

FOREIGN PATENT DOCUMENTS

| | | |
|---|---|---|
| DE | 10 2016 202 752 A1 | 8/2014 |
| DE | 20 2014 101 755 U1 | 8/2014 |
| DE | 10 2013 211 877 A1 | 1/2015 |
| DE | 10 2015 220 911 A1 | 4/2017 |
| DE | 10 2018 203 875 A1 | 9/2019 |
| EP | 2 674 328 A2 | 12/2013 |

OTHER PUBLICATIONS

German-language Written Opinion (PCT/ISA/237) issued in PCT Application No. PCT/EP2021/054889 dated Jun. 7, 2021 (three (3) pages).

German-language Search Report issued in German Application No. 10 2020 106 299.0 dated Dec. 1, 2020 with partial English translation (11 pages).

* cited by examiner

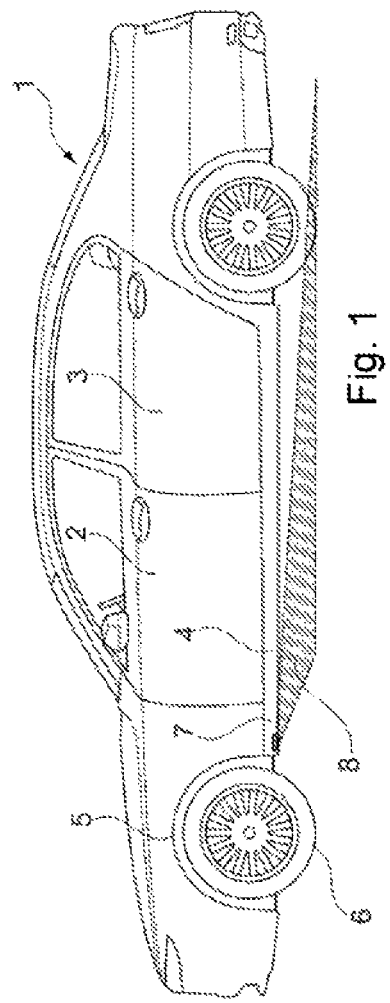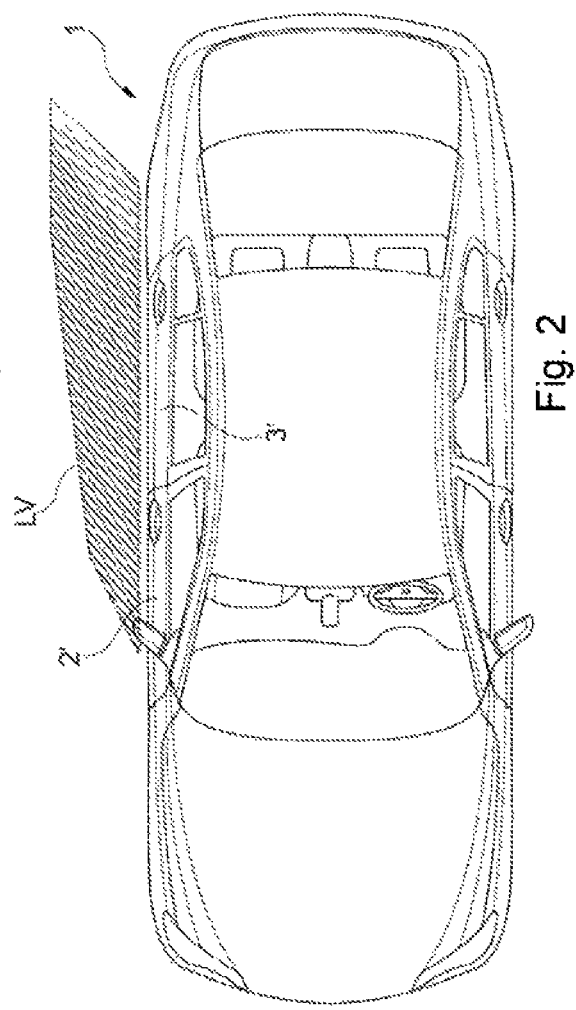

SURROUNDINGS ILLUMINATION DEVICE FOR A MOTOR VEHICLE

BACKGROUND AND SUMMARY OF THE INVENTION

The invention relates to a motor vehicle having a surroundings illumination device for illuminating the ground in the surroundings of the motor vehicle.

Integrating a surroundings illumination device in the exterior door handle of a vehicle, which is activated upon unlocking of the vehicle, is known. There are also exit lights, which are installed in the lower edge of the door lining of a motor vehicle. Surroundings lights in the exterior door handle and exit lights have the disadvantage that they are only visible when the door is closed or open, respectively.

A surroundings illumination device using a projection module made up of an array of projection optical units is known from document DE 10 2013 211 877 A1. Light patterns, for example stripe patterns, are projected on the ground in the surroundings of the motor vehicle. The projection module is only suitable for generating a single predetermined light distribution.

Document DE 10 2015 220 911 A1 discloses a surroundings illumination device having a projection module which comprises multiple partial arrays made up of projection optical units, which can each generate different light distributions on the ground in the surroundings of the motor vehicle using corresponding light sources. Both a homogeneous light distribution and a light distribution in the form of a light pattern can be generated here.

The object of the invention is to provide a motor vehicle having a surroundings illumination device which can generate a distinctive light distribution on the ground in the surroundings of the motor vehicle easily and efficiently.

This object is achieved by the motor vehicle according to the claimed invention.

The motor vehicle according to an embodiment of the invention, which is in particular a passenger vehicle, comprises a surroundings illumination device for illuminating the ground in the surroundings of the motor vehicle, wherein the surroundings illumination device has a controller for controlling the illumination of the ground and a projection module and optionally multiple projection modules. A respective projection module comprises a light device having a plurality of illuminants and an array made up of projection optical units, wherein a respective projection optical unit contains an associated object structure and an associated projection lens, so that upon illumination of the respective projection optical unit using the light device, the associated object structure is projected by way of the associated projection lens on the ground.

A projection module is preferably used in the motor vehicle according to an embodiment of the invention, which is based on the technology of the projection display described in document DE 10 2009 024 894 A1 or in document DE 10 2011 076 083 A1. In contrast to the projection display disclosed therein, the array made up of projection optical units is divided into multiple partial arrays for generating different partial graphics, as is explained in more detail hereinafter. The entire content of the disclosure of the two documents just mentioned is made part of the content of this application by reference.

According to an embodiment of the invention, the array made up of projection optical units comprises multiple (disjoint) partial arrays, which can be illuminated separately using an illuminant of the light device associated with the respective partial array, due to which a partial graphic is generated on the ground in the surroundings of the motor vehicle by way of the projection of the associated object structures of the projection optical units of the respective partial array. The object structures of the projection optical units within a respective partial array are identical, but the object structures of the projection optical units differ from one another between the partial arrays. The object structures thus generate the same individual images, which are preferably projected with the same size and same position on the ground in the surroundings of the motor vehicle. The superposition of these individual images results in the corresponding partial graphic.

The concept of the partial graphics is to be understood broadly. This can be a graphic having an arbitrary structure, for example in the form of a pattern. Furthermore, a partial graphic can possibly also contain one or more symbols, wherein a symbol can in particular also comprise textual elements. The producer or the model of the motor vehicle can be indicated by a symbol, for example.

The controller of the surroundings illumination device according to an embodiment of the invention is configured to operate the projection module for a predefined time span in a dynamic operating mode. The predefined time span does not necessarily have to be a time span having fixed length, rather it can also be variably defined. In particular, the beginning and/or the end of the time span can be coupled to predetermined events, wherein examples of such events are mentioned hereinafter.

In the dynamic operating mode, the brightnesses of the illuminants of at least some and preferably all illuminants of the plurality of illuminants are automatically varied based on a predetermined (chronological) sequence pattern. The predetermined sequence pattern describes for each illuminant of the at least some illuminants a chronological variation of its brightnesses. A chronological variation of the brightnesses of a respective illuminant is to be understood here as a brightness curve which contains changing brightnesses, which does not preclude the brightness also being able to remain constant in one or more partial sections of the predetermined time span of the dynamic operating mode, however. In addition, the chronological variations (i.e. the corresponding brightness curves) differ between at least two illuminants and in particular all of the at least some illuminants at least in sections in the predetermined time span of the dynamic operating mode. The scaled brightness curves of the corresponding illuminants, i.e. their relative brightnesses in relation to their respective maximum brightness in the predetermined time span, are preferably also different at least in sections in the predetermined time span.

According to an embodiment of the invention, the brightnesses of the illuminants of the light device are thus changed based on a predetermined sequence pattern, which is designed in such a way that a dynamic movement effect is generated by way of the displayed partial graphics due to the different chronological variations of the brightnesses of the illuminants. In this way, a light distribution which is very striking to the observer is generated.

In one preferred embodiment, the chronological variations between all illuminants of the at least some illuminants of the light device differ at least in sections in the predetermined time span. A particularly high level of dynamics in the light projection generated on the ground can be achieved in this way.

In a further, particularly preferred embodiment, at least a part of the partial graphics on the ground in the surroundings of the motor vehicle overlaps. Preferably, all partial graphics overlap, i.e. each partial graphic covers at least a part of each other partial graphic on the ground in the surroundings of the motor vehicle.

In a further particularly preferred design, the sequence pattern comprises sequence pattern sections repeating periodically in time, due to which a light projection which is particularly intuitive for the observer is generated, which the observer also still remembers at a later point in time.

The number of partial arrays of the array made up of projection optical units can be selected differently. Preferably, the array is formed from 2 to 8 partial arrays. An array made up of 4 partial arrays has proven to be particularly practical. Depending on the design, the number of projection optical units in the respective partial array can also be selected differently. A partial array preferably comprises between 30 and 40 projection optical units. The number of projection optical units can also differ between the partial arrays.

The illuminants which are associated with the partial arrays can be designed differently. Preferably, a respective illuminant consists of a single light source, preferably an LED light source or a laser light source. A part of the illuminants possibly consists of LED light sources and another part of the illuminants consists of laser light sources.

In a further preferred embodiment, the predetermined sequence pattern is designed in such a way that the brightnesses of the illuminants of the at least some illuminants and preferably all illuminants of the light device are varied in the predetermined sequence pattern at least in sections by dimming. Nonetheless, it is optionally also possible that in the predetermined sequence pattern, the brightnesses of the illuminants are changed at least in sections by sudden switching on and off.

As already mentioned above, the dynamic operating mode can be coupled to different events. For example, the beginning of the dynamic operating mode can be triggered by an approach of a user to the motor vehicle, wherein the user carries a radio key for startup of the motor vehicle. The concept of the radio key is to be understood broadly here. This can be any arbitrary unit using which an access to the motor vehicle and the subsequent startup of the motor vehicle are enabled via a contactless communication of the unit with the motor vehicle.

Alternatively or additionally, the beginning of the dynamic operating mode can be linked to unlocking of a central locking system of the motor vehicle and/or to opening of an access door of the motor vehicle. It is also possible that the beginning of the dynamic operating mode is coupled to engaging of the reverse gear in the motor vehicle. In this case, the light projection generated in the dynamic operating mode is used as a maneuvering light. This maneuvering light is preferably ended when the speed in the reverse gear exceeds a predetermined threshold, for example 10 km/h. The maneuvering light is preferably also ended when a forward gear is engaged again.

In a further design of the motor vehicle according to the invention, the controller is furthermore configured to operate the projection module for a predetermined time period in a static operating mode, in which at least a part of the illuminants and in particular all illuminants of the light device are operated at constant brightness and the brightness of none of the illuminants is varied. The static operating mode can optionally also again be coupled to specific events. In one variant, it is defined in the motor vehicle, for example via an input at a user interface, whether the dynamic or static operating mode is used. If the static operating mode is used, the events to which the beginning or the end of the static operating mode is coupled can possibly be the same events which were described further above for the dynamic operating mode.

In a further preferred design of the invention, one or more screens are provided in the projection module, which are arranged in such a way that the light of the associated illuminant of a respective partial array is exclusively incident on the respective partial array. Separation of the illuminants from one another is achieved in a simple manner in this way.

Depending on the design of the projection module, a different number of projection optical units can be provided in the array, for example between 100 and 200 projection optical units. The size of the individual projection lenses can also be selected differently. A respective projection lens preferably has a diameter of 2000 µm or less.

In a further preferred embodiment, white light is used to generate the partial graphics. The light device or the illuminants thus generate white light.

In a further preferred embodiment, the projection module is arranged in a light shaft extending in the vehicle body of the motor vehicle, by which direct dazzling by the illuminants of the projection module is avoided.

In a further design, the installation position of the projection module in the motor vehicle can be adjusted, i.e. a corresponding adjustment device is provided. This adjustment device can enable a manual and/or automatic adjustment of the installation position depending on the application. In this way, manufacturing tolerances in the integration of the projection module in the vehicle can be taken into consideration and the corresponding light distribution can always be imaged sharply by adjusting the installation position of the projection module.

In one preferred variant, the projection module of the surroundings illumination device is attached in the region of an access door of the motor vehicle in such a way that one or more of the partial graphics are generated in the opening region of the access door, wherein the position of these partial graphics is preferably not changed or shaded by the opening of the access door. The access door is preferably a passenger entry door. In this variant of the invention, the safety during the entry or exit of persons into or from the motor vehicle is increased by a good illumination of the ground in front of the passenger entry.

In a further variant, the projection module is provided in a door sill of the motor vehicle, in particular at an installation position which is located in front of a passenger entry door in the longitudinal direction of the motor vehicle from the front to the rear end.

In a further, particularly preferred embodiment, the projection module is arranged in the motor vehicle in such a way that the entirety of all partial graphics on one side of the motor vehicle extend essentially along a driver or front passenger entry door and an entry door for rear passengers located behind it. Surroundings illumination devices having corresponding projection module are preferably provided on both sides of the motor vehicle.

Alternatively or additionally, there is the possibility that a surroundings illumination device is installed in the motor vehicle, the projection module of which in operation generates partial graphics below and/or in the longitudinal direction of the motor vehicle behind a luggage compartment access door. The concept of the luggage compartment access door is to be understood broadly and, in addition to the luggage compartment lid of a notchback sedan, can also comprise the rear hatch of a vehicle having a hatchback or fastback.

In a further variant of the motor vehicle according to the invention, the partial graphics on the ground indicate the detection field of a wireless sensor, wherein the detection field is preferably an operating field, so that when body parts and/or objects are introduced into the operating field, an operating action is automatically triggered in the motor vehicle. In one preferred variant, the wireless sensor is designed in such a way that if a foot is detected in the detection field, the luggage compartment access door is automatically unlocked and/or opened.

In addition to the above-described motor vehicle, the invention furthermore relates to a surroundings illumination device for this motor vehicle. The surroundings illumination device is provided for illuminating the ground in the surroundings of the motor vehicle and comprises a controller for controlling the illumination of the ground and a projection module.

The projection module comprises a light device having a plurality of illuminants and an array made up of projection optical units, wherein a respective projection optical unit contains an associated object structure and an associated projection lens, so that upon illumination of the respective projection optical unit using the light device, the associated object structure is projected by way of the associated projection lens on the ground.

The array made up of projection optical units comprises multiple partial arrays, which can be illuminated separately using an illuminant of the light device associated with the respective partial array, by which, by way of the projection of the associated object structures of the projection optical units of the respective partial array, a partial graphic is generated on the ground in the surroundings of the motor vehicle. The object structures of the projection optical units within a respective partial array are identical, however the object structures of the projection optical units differ from one another between the partial arrays.

The controller of the surroundings illumination device according to an embodiment of the invention is configured to operate the projection module for a predetermined time span in a dynamic operating mode, in which the brightnesses of the illuminants of at least some illuminants of the plurality of illuminants are varied automatically based on a predetermined sequence pattern, wherein the predetermined sequence pattern for each illuminant of the at least some illuminants describes a chronological variation of its brightnesses and the chronological variations differ between at least two illuminants at least in sections in the predetermined time span.

The surroundings illumination device according to an embodiment of the invention can comprise one or more of the above-described features of preferred embodiments of the motor vehicle according to the invention, if these features relate to the surroundings illumination device.

Exemplary embodiments of the invention are explained in detail hereinafter on the basis of the appended figures.

BRIEF DESCRIPTION OF THE DRAWINGS

FIG. 1 shows a side view of a motor vehicle according to an embodiment of the invention having a surroundings illumination device.

FIG. 2 shows a top view of the motor vehicle of FIG. 1.

DETAILED DESCRIPTION OF THE DRAWINGS

Figure 3:
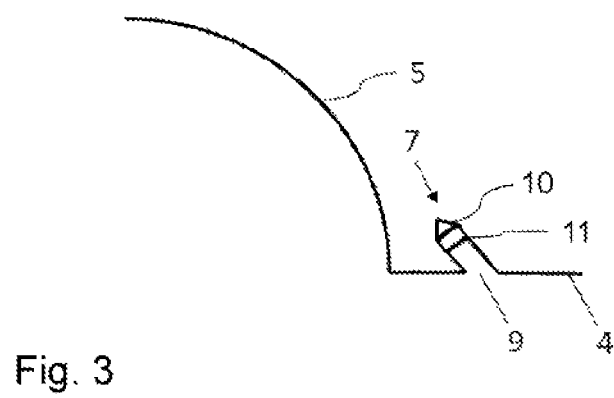
FIG. 3 shows a schematic detail view of the surroundings illumination device shown in FIG. 1.

An embodiment of a motor vehicle according to the invention having a surroundings illumination device is described hereinafter, which is integrated in the door sill of the motor vehicle and is used for the lateral illumination of the region adjacent to the passenger entry doors of the motor vehicle.

FIG. 1 shows a side view of the motor vehicle in the form of the passenger vehicle 1. The passenger vehicle comprises on the left side shown a driver door 2 and a rear door 3. Similarly, a front passenger door 2' and a rear door 3' located behind it are provided on the opposite side of the vehicle (FIG. 2). In the embodiment of FIG. 1, a surroundings illumination device having a projection module 7 is provided in the door sill 4 below the doors 2 and 3. This illumination device is located at the front end of the door sill in the region of the wheel housing 5, which encloses the wheel 6. The projection module of the surroundings illumination device comprises an array made up of projection optical units to deliberately generate dynamically variable light distributions adjacent to the door 2 or adjacent to the door 3 of the motor vehicle.

The projection module 7 uses the technology of the projection display which is described in documents DE 10 2009 024 894 A1 and DE 10 2011 076 083 A1 already mentioned above. In this projection display, a multichannel optical unit having a two-dimensional array made up of projection optical units comprising microlenses and object structures is used to project an image. In contrast to this projection display, in the projection module 7, the array made up of projection optical units is divided into four partial arrays having different projection optical units. The individual partial arrays are illuminated separately using an associated LED, as described in greater detail hereinafter.

FIG. 2 schematically shows a light distribution LV, which can be generated by the projection module 7 on the ground adjacent to the motor vehicle 1. This light distribution is a graphic which results when all LEDs of the partial array of the projection module are switched on simultaneously. The graphic is a superposition of four partial graphics here, which are generated by the illumination of the respective partial arrays using the associated LEDs.

The projection module 7 is very compact and has dimensions in the centimeter range. In one variant, the width, height, and length of the projection module are each approximately 15 mm. Each projection optical unit of a respective partial array of the projection module contains the same object structure and thus generates the same individual image. The overall image which represents the partial graphic generated using the corresponding partial array is composed of the superposition of these individual images. The object structures between the partial arrays are different here, so that a different partial graphic is generated using each partial array. As already mentioned, the generation of a light distribution LV is shown in FIG. 1 and FIG. 2, which is projected on the ground adjacent to the doors 2 and 2'. In FIG. 1, the propagation direction of the light of the projection module 7 cast on the ground is identified by reference sign 8.

The light distribution LV projected on the ground adjacent to the vehicle is visible in the top view of FIG. 2 and generates the effect of a light carpet. It is to be noted here that the light distribution, in contrast to FIG. 1, is shown on the right next to the vehicle 1 adjacent to the doors 2' and 3'. This is possible because projection modules 7 are installed in the motor vehicle symmetrically on the right and left side. In other words, mirrored light distributions are accordingly generated both on the left side and on the right side of the vehicle adjacent to the entry doors. For reasons of clarity, only the light distribution adjacent to the doors 2' and 3' is shown in FIG. 2. In the exemplary embodiment of FIG. 2, the light distribution LV represents a pattern made up of parallel stripes which extend diagonally to the longitudinal axis of the vehicle. The stripes are shown dark and represent bright bars on the ground adjacent to the vehicle in the actual light distribution. As is apparent from FIG. 2, the light distribution widens from the front door 2' toward the region behind the door 3'. It can furthermore be seen that the stripe pattern blurs in the rear region, wherein this effect is generated by a decreasing brightness of the stripes.

The stripe pattern shown is solely an example of a generated light graphic and arbitrary other patterns can be generated. However, it is essential to an embodiment of the invention that the projection module 7 can be operated in a dynamic operating mode, in which a chronologically varying light graphic is generated. This is achieved by the chronological variation of the brightnesses of the LEDs associated with the respective partial arrays. This variation has the result that the corresponding partial graphics having variable brightnesses appear on the ground adjacent to the motor vehicle and a dynamic movement effect is thus generated for the observer. The dynamic operating mode is used in the embodiment described here as a welcome scenario for a driver or a front passenger. The approach of a radio key carried by the driver or front passenger to the motor vehicle is detected in a way known per se for this purpose and subsequently the generation of a dynamically moving graphic laterally adjacent to the motor vehicle is triggered.

The light graphic can optionally also be generated, for example, only in the region of the rear door 3 or 3'. In this case, the projection module can be arranged on the front edge of the rear door. In addition, it is ensured by the arrangement of the projection module in the door sill 4 that shading of the light distribution does not occur upon opening of the doors, i.e. the light distribution is always visible on the ground of the vehicle independently of the position of the doors.

FIG. 3 shows in section a detail view of the projection module from FIG. 1. The module 7, which is integrated adjacent to the wheel housing 5 in the door sill 4, comprises a schematically indicated light device 10 having four illuminants in the form of individual LEDs, as described in greater detail hereinafter on the basis of FIG. 5. The array 11 made up of projection optical units adjoins the light device 10. The array is again only schematically indicated and is also explained in more detail on the basis of FIG. 5. According to FIG. 3, the projection module is arranged in a light shaft 9 extending diagonally to the rear, so that it is ensured that the light source cannot be seen directly, by which legal requirements are taken into consideration.

Figure 4:
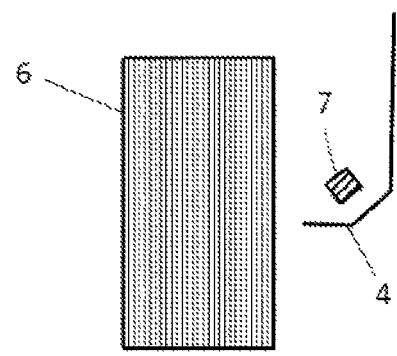
FIG. 4 shows a view of the surroundings illumination device from FIG. 3 viewed in the longitudinal direction of the motor vehicle.

FIG. 4 once again shows in section a view of the projection module from FIG. 3 seen in the longitudinal direction of the vehicle from the front to the rear. In addition to the module 7, the front wheel 6 of the vehicle and the door sill 4 can be seen in FIG. 4. The door sill extends here in a partial section at an angle of approximately 45° diagonally in relation to the ground. The projection module 7, which is only schematically indicated, is located opposite to this partial section, wherein the light shaft is not shown for reasons of clarity. The projection module 7 is held via a holding device on the door sill, wherein the light shaft 9 is part of the holding device. The holding device itself is not shown in detail. The holding device can be removed here from the sill, so that the projection module can be replaced by a new one in the event of a defect. To compensate for manufacturing tolerances, an adjustment device is preferably provided, using which the position of the projection module can be set relative to the light shaft within predetermined limits manually and possibly also automatically via corresponding actuators. In this way, it can be achieved that the light distribution on the ground is always imaged sharply.

Figure 5:
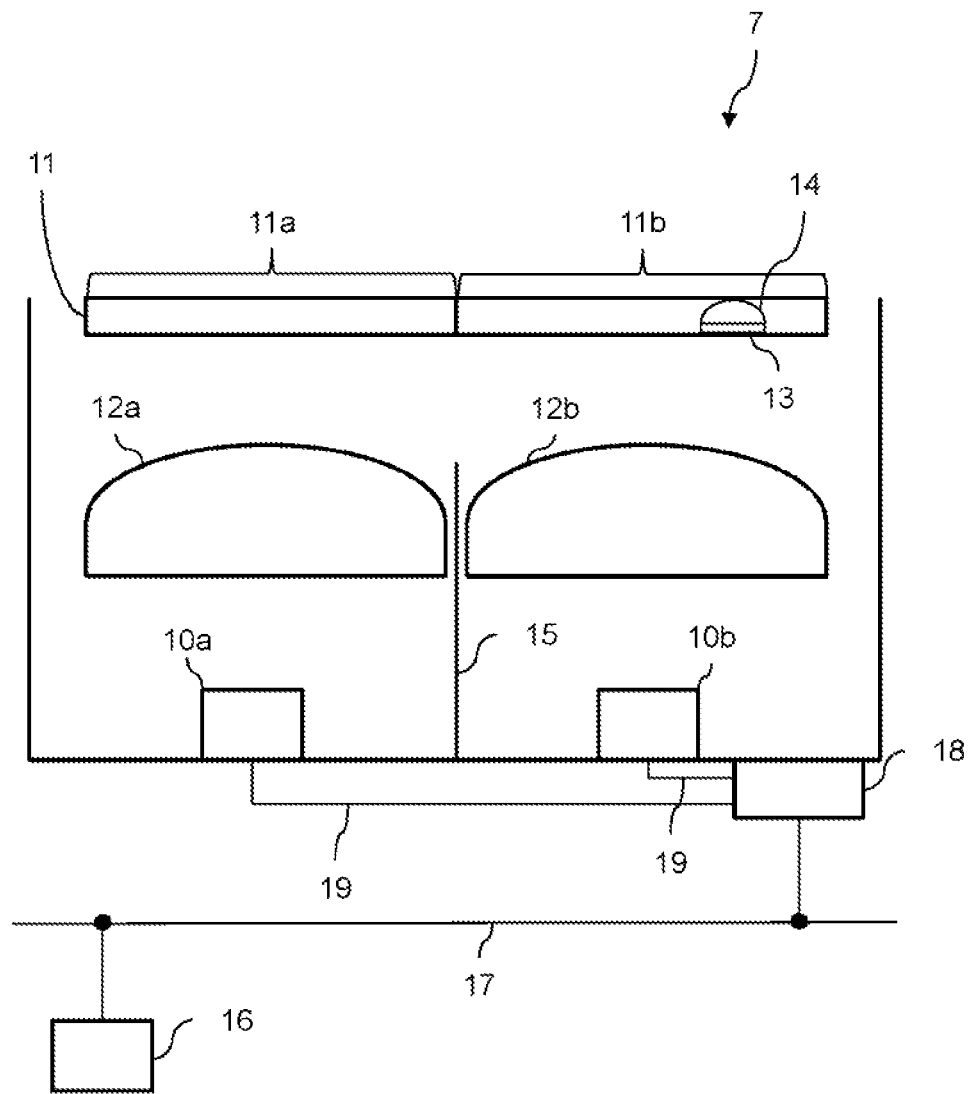
FIG. 5 shows a schematic detailed sectional view through the projection module shown in the preceding figures.

FIG. 5 shows a sectional view of the detailed structure of the projection module 7 from the preceding figures. The module comprises as light device two LEDs 10*a* and two LEDs 10*b*, wherein only a single LED 10*a* and a single LED 10*b* are visible from the sectional view of FIG. 5. The LEDs 10*a* and 10*b* emit in the direction upward in FIG. 5. For beam guiding, a collimator lens 12*a* or 12*b* is provided above each of the LEDs 10*a* and 10*b*, respectively. The light of the LEDs exiting from the collimator lenses is incident on the array 11 made up of projection optical units, which is divided in the embodiment described here into four partial arrays 11*a*, 11*b*, as is recognizable from FIG. 6 described hereinafter. Only two of these partial arrays are visible in the sectional view of FIG. 5. Each of the partial arrays comprises a plurality of object structures 13 having associated projection lenses or microlenses 14. For reasons of clarity, only one object structure and one projection lens are shown in FIG. 5. The identical object structures are introduced into each partial array, wherein the object structures of one partial array differ from the object structures of all other partial arrays, however.

Figure 6:
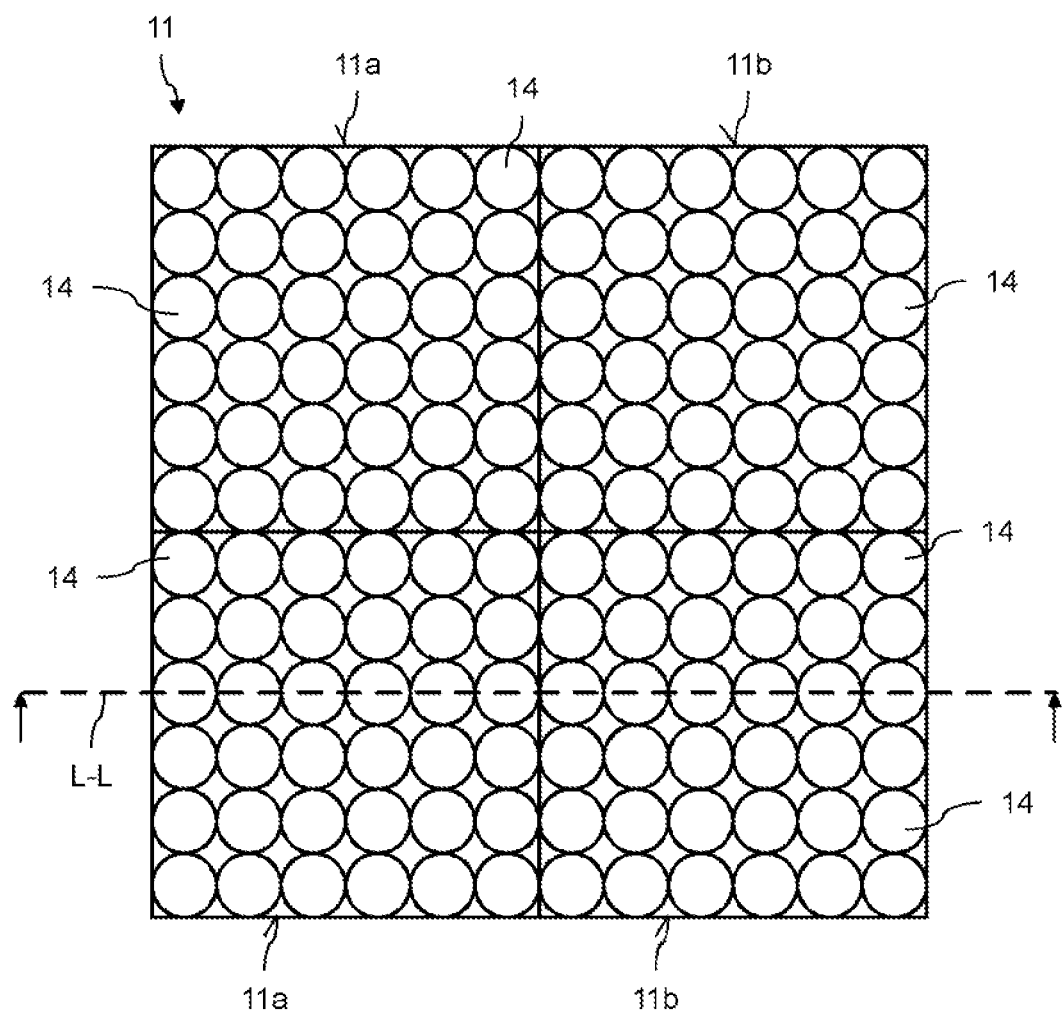
FIG. 6 shows a top view of the array made up of projection optical units of the projection module from FIG. 5.

The division of the array into four partial arrays is apparent from FIG. 6, which shows a top view from above of the array 11 of FIG. 5. Furthermore, section line L-L for the sectional view of FIG. 5 is shown in this figure. As can be seen, four square partial arrays 11*a* and 11*b* exist, wherein two partial arrays 11*a* and two partial arrays 11*b* are arranged one behind another in FIG. 6. Each partial array comprises a square field made up of adjacent projection optical units, which in turn consist of microlenses 14 and object structures 13. Only the microlenses 14 are apparent from FIG. 6, which are also only partially identified with this reference sign for reasons of clarity. In the example of FIG. 6, each partial array contains 36 projection optical units arranged in the square having corresponding lenses 14. This number is solely an example and another number of projection optical units can also be provided in the respective partial array. Furthermore, it is not absolutely necessary for the individual partial arrays to have the same size and shape.

All partial arrays having the associated collimator lenses and LEDs have the identical structure disclosed in FIG. 5, but differ in that the object structures 13 within a respective partial array are identical, but are different between the partial arrays. This also applies to the two partial arrays identified by the same reference sign 11*a* or 11*b*, respectively. To ensure that the light of a respective LED is only incident on a single partial array located above it, screens 15 extend between all adjacent partial arrays, wherein one such screen is apparent from the sectional view of FIG. 5.

FIG. 5 furthermore schematically indicates a design of a controller for activating the respective LEDs 10a or 10b. The controller represents a control unit 16 installed in the motor vehicle, which is connected to a LIN bus 17 of the motor vehicle. Furthermore, a chip 18 is coupled to this LIN bus. This chip and all four LEDs 10a, 10b of the four partial arrays 11a, 11b are seated on a circuit board (not shown), on which lines 19 are provided, via which the chip 18 is connected to the respective LEDs. Only two of the four provided lines are shown in the sectional view of FIG. 5.

Corresponding control commands for setting the brightnesses of the individual LEDs are given on the LIN bus 17 via the control unit 16. These commands are received by the chip 18, which then causes the setting or variation of the brightnesses of the LEDs in accordance with the commands of the control unit 16 using corresponding electrical signals on the lines 19. Control commands for a dynamic operating mode and a static operating mode are stored in the control unit 16. In the static operating mode, all LEDs of the projection module 7 are switched on so that a partial graphic is projected on the ground adjacent to the motor vehicle by each partial array. As indicated by way of example in FIG. 2, overall the light distribution LV results therefrom. For the dynamic operating mode, a chronological sequence pattern is stored in the control unit 16, which varies the brightnesses of the individual LEDs differently from one another for a predetermined time span, to generate the effect of a dynamically moving light carpet in this way.

Figure 7:
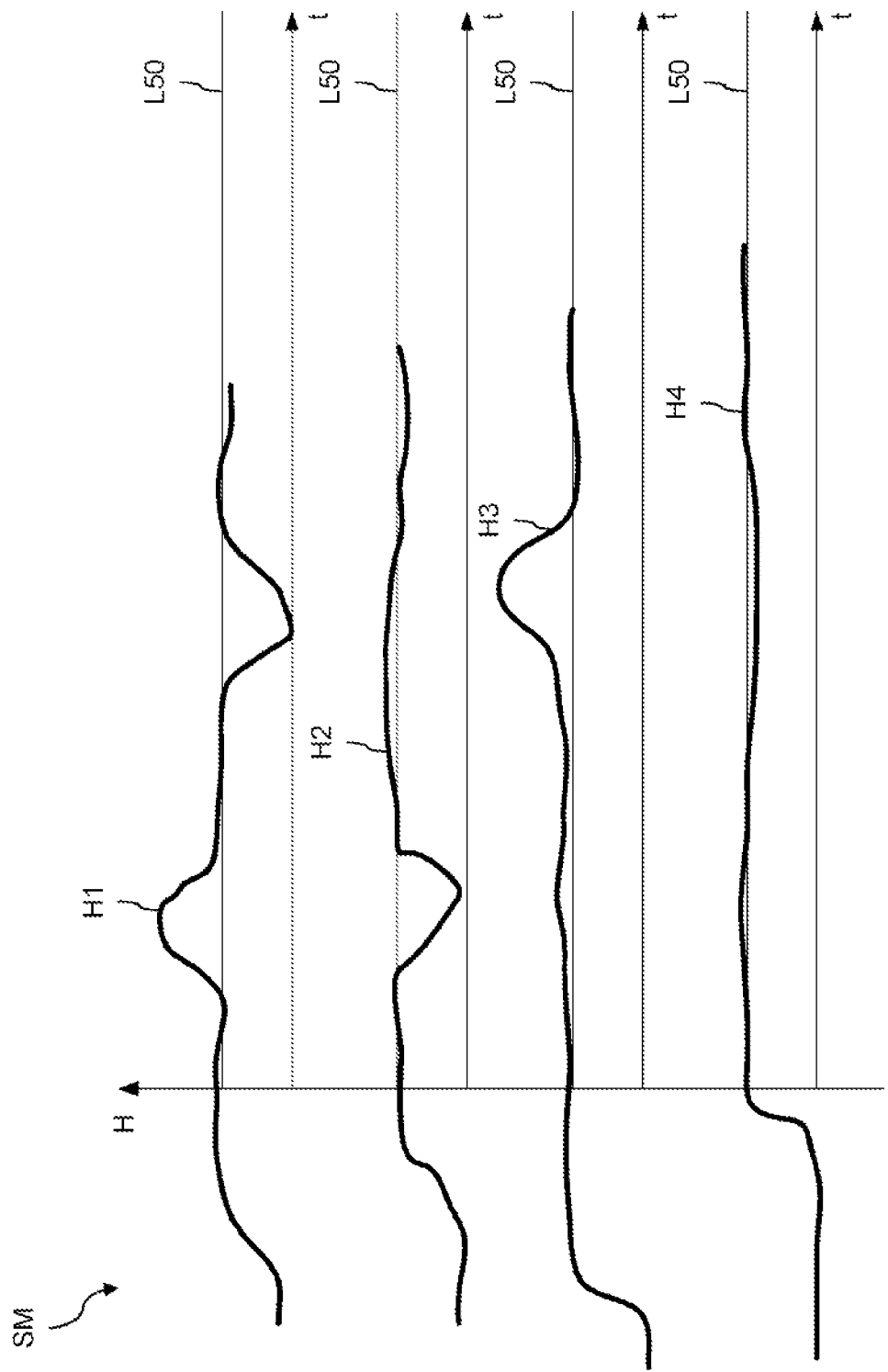
FIG. 7 shows a diagram which illustrates an example of a sequence pattern for activating the LEDs of the projection module from FIG. 5.

FIG. 7 shows by way of example a chronological sequence pattern SM for the dynamic operating mode of the projection module 7. In FIG. 7, four time axes t extending in the horizontal direction are shown, wherein each individual time axis relates to another LED of the partial arrays from FIG. 6. Furthermore, the brightness H of the respective LEDs is shown in the vertical direction in FIG. 7, wherein each LED has a separate time curve of its brightness, which is represented by corresponding brightness lines H1, H2, H3, and H4. The point of intersection of a corresponding time axis with the axis of the brightnesses corresponds to a brightness of 0 for the brightness line which extends along the observed time axis. Furthermore, the brightness value for 50% of the maximum power of the LED is indicated by a line L50 for illustration for each brightness curve.

As can be seen from the sequence pattern SM, the brightnesses of the individual LEDs are activated differently. First, the LED which corresponds to the brightness line H3 is switched on, whereas the other LEDs are activated later. All LEDs are first set to a brightness value of approximately 50%. Subsequently, the brightnesses of the various LEDs are varied, wherein in the illustrated example first the brightness of the LED having the brightness line H1 is increased and at the same time the brightness of the LED having the brightness line H2 is decreased. In contrast, at a later point in time the LED having the brightness line H1 is dimmed, whereas the brightness of the LED having the brightness line H3 is increased. In the illustrated time interval, the brightness of the LED having the brightness line H4 is kept essentially constant. Nonetheless, this brightness can be varied suitably at a later point in time. The chronological sequence pattern of the variation of the brightnesses of the individual LEDs shown in FIG. 7 is solely an example and can also be designed differently as desired. However, it is decisive that the dynamic effect of a moving light graphic is generated by variation of the brightnesses.

FIG. 8 to FIG. 11 illustrate by way of example the generation of corresponding partial graphics by way of the LEDs of the respective partial arrays in the projection module of FIG. 5, in order to generate a dynamic light carpet. FIG. 8 to FIG. 11 show for this purpose the light graphic generated next to the motor vehicle at progressing points in time during the dynamic operating mode. In each of the figures, the extension of the motor vehicle from FIG. 1 from front to rear is illustrated by the arrow P. A light graphic is indicated by way of example, which is projected on the left next to the motor vehicle on the ground, as is also the case in FIG. 1. In contrast to FIG. 1 and FIG. 2, however, light graphics having a honeycomb structure are now generated. The bright elements of the light graphics are represented in FIG. 8 to FIG. 11 as dark objects and represent hexagons or sections of hexagons.

Figure 8:
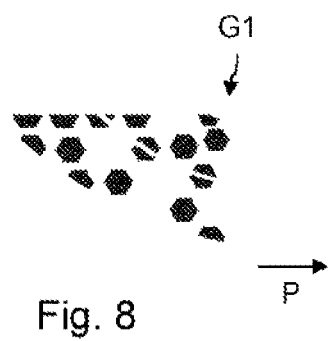
FIG. 8 to FIG. 11 show examples of graphics which can be generated in the dynamic operating mode of the projection module from FIG. 5.
Figure 9:
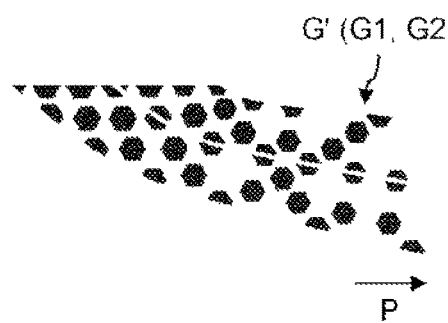

In the scenario of FIG. 8, a corresponding dynamic operating mode has just begun. At this point in time, only one of the four LEDs of the projection module 7 is activated. The partial graphic G1 is generated by the associated partial array, which is only located in a front region adjacent to the position of the projection module 7 in the door sill. At a later point in time, a further LED of the projection module 7 is additionally switched on, which generates the partial graphic G2. This is indicated in FIG. 9. This figure shows the state when both the partial graphic G1 is cast on the ground by the corresponding switched-on LED and the partial graphic G2 is cast on the ground by the additionally switched-on LED. In this way, the overall graphic G' results. Since the partial graphic G2 also covers a region which is located further to the rear in the longitudinal direction of the motor vehicle in relation to the partial graphic G1, the overall graphic G' has a greater extension along the corresponding side of the motor vehicle. Furthermore, the partial graphic G2 fills up dark regions of the previous partial graphic G1 by way of corresponding hexagons.

Figure 10:
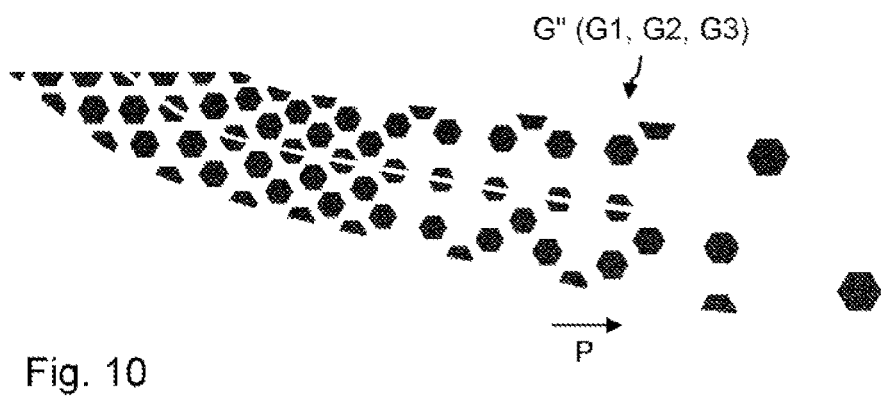

In the same way, in the scenario of FIG. 10, a further one of the four LEDs is switched on, which generates the partial graphic G3. This results in a further enlarged overall graphic G", which extends still further to the rear in the longitudinal direction of the motor vehicle, since the partial graphic G3 covers a region which is located further to the rear in the longitudinal direction of the motor vehicle in relation to the partial graphics G1 and G2. Furthermore, the partial graphic G3 again fills up dark regions of the previous graphic G' by way of corresponding hexagons.

Figure 11:
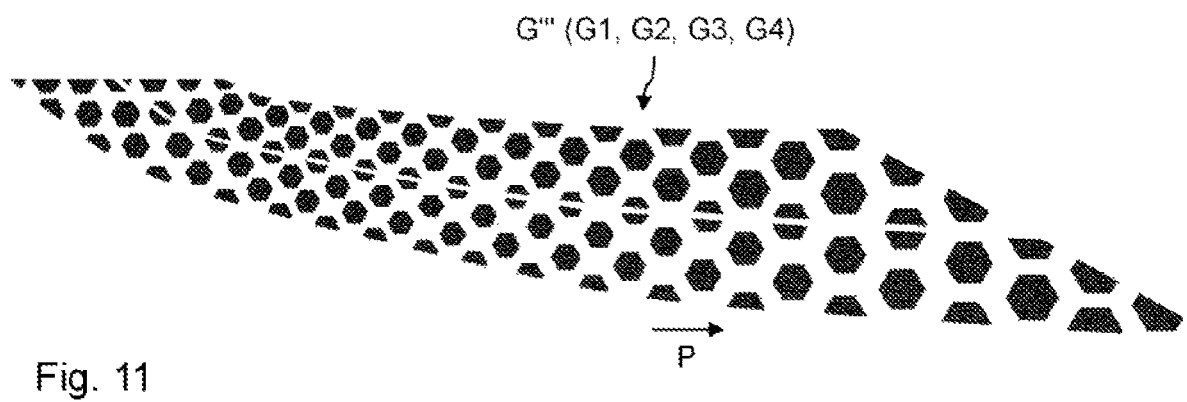

FIG. 11 shows a scenario in which all four LEDs of the projection module 7 are switched on. In other words, the partial graphic G4 is now additionally generated by the last switched-on LED of the corresponding partial array. This partial graphic again fills up dark regions of the previous graphic G" by way of corresponding hexagons and extends in the longitudinal direction of the motor vehicle still further to the rear than the other partial graphics G1 to G3. As a result, finally the overall graphic G''' results, which represents a visually appealing honeycomb structure, which extends in the longitudinal direction of the motor vehicle from the projection module to the region of the rear wheels of the motor vehicle.

Using the dynamic operating mode explained on the basis of FIG. 8 to FIG. 11, an appealing light effect in the form of a dynamic magnification of a light carpet can be generated. Nonetheless, the described dynamic operating mode is solely an example and the brightnesses of the individual LEDs can also be varied in another way, as long as a chronologically varying light graphic is generated on the ground of the motor vehicle.

The above-described embodiments of the invention have an array of advantages. In particular for the first time a dynamically variable light distribution on the ground in the surroundings of the motor vehicle is generated by way of a projection module made up of a plurality of projection optical units. In this way, very appealing light effects, for example in the form of a welcome scenario for a driver or front passenger of the motor vehicle, can be achieved. These dynamic light effects can be generated in a simple manner by separate activation of corresponding LEDs which each illuminate partial arrays of an array made up of projection optical units in order to generate corresponding partial graphics on the ground in the surroundings of the motor vehicle in this way. Due to the use of a compact projection module, in addition little installation space is required, and even in the event of soiling or partial concealment of the illuminants of the projection module, the generated light graphic remains visible.

List Of Reference Signs 1 motor vehicle
2, 2', 3, 3' vehicle doors
4 door sill
5 wheel housing
6 wheel
7 projection module
8 light propagation
LV light distribution
9 light shaft
10 illuminants
10a, 10b LEDs
11 array made up of projection optical units
11a, 11b partial arrays
12a, 12b collimator lenses
13 object structure
14 projection lens
15 screen
16 control unit
17 LIN bus
18 chip
19 lines
L-L section line
t time axis
H brightness
H1, H2, H3, H4 brightness lines
L50 brightness at 50% of the maximum power of the LED
P longitudinal extension of the motor vehicle
G', G'', G''' graphics
G1, G2, G3, G4 partial graphics

The invention claimed is:

1. A motor vehicle comprising:
a surroundings illumination device for illuminating a ground in surroundings of the motor vehicle, wherein:
the surroundings illumination device comprises a controller for controlling illumination of the ground and a projection module, which comprises a light device having a plurality of illuminants and an array made up of projection optical units, wherein a respective projection optical unit contains an associated object structure and an associated projection lens, so that upon illumination of the respective projection optical unit using the light device, the associated object structure is projected by way of the associated projection lens on the ground, and wherein there is a one-to-one correspondence between the object structures and the projection lenses of the projection optical units;
the array made up of projection optical units is divided into multiple partial arrays, wherein each partial array contains a subset including a plurality of the projection optical units, and each partial array can be illuminated separately using an illuminant of the light device associated with the respective partial array, such that by way of the projection of the associated object structures of the projection optical units of the respective partial array, a partial graphic is generated on the ground in the surroundings of the motor vehicle, wherein the object structures of the projection optical units are identical within a respective partial array, such that each of the object structures within the respective partial array generates the same individual image, but the object structures of the projection optical units differ from one another between the partial arrays; and
the controller is configured to operate the projection module for a predetermined time span in a dynamic operating mode, in which brightnesses of at least some illuminants of the plurality of illuminants are automatically varied based on a predetermined sequence pattern, wherein the predetermined sequence pattern, for each illuminant of the at least some illuminants, describes a chronological variation of its brightness and the chronological variations between at least two illuminants differ at least in sections in the predetermined time span.

2. The motor vehicle according to claim 1, wherein the chronological variations between all illuminants of the at least some illuminants of the light device differ at least in sections in the predetermined time span.

3. The motor vehicle according to claim 1, wherein at least a part of the partial graphics overlaps with one another on the ground in the surroundings of the motor vehicle.

4. The motor vehicle according to claim 1, wherein the sequence pattern comprises sequence pattern sections repeating periodically in time.

5. The motor vehicle according to claim 1, wherein the array made up of projection optical units is formed from four partial arrays and/or each partial array comprises between 30 and 40 projection optical units.

6. The motor vehicle according to claim 1, wherein a respective illuminant consists of a single light source.

7. The motor vehicle according to claim 6, wherein the single light source is an LED light source or a laser light source.

8. The motor vehicle according to claim 1, wherein the predetermined sequence pattern is configured such that the brightnesses of the illuminants of the at least some illuminants in the predetermined sequence pattern are varied at least in sections by dimming.

9. The motor vehicle according to claim 1, wherein a beginning of the dynamic operating mode is coupled to at least one of:
an approach of a user to the motor vehicle, wherein the user carries a radio key for startup of the motor vehicle;
unlocking of a central locking system of the motor vehicle;
opening of an access door of the motor vehicle; or
engaging of a reverse gear in the motor vehicle.

10. The motor vehicle according to claim 1, wherein the controller is further configured to operate the projection module for a predetermined time period in a static operating mode, in which at least a part of the illuminants of the light device is operated at a constant brightness and the brightness of none of the illuminants is varied.

11. The motor vehicle according to claim 1, wherein one or more screens are provided in the projection module, and the one or more screens are arranged such that light of an associated illuminant of a respective partial array is exclusively incident on the respective partial array.

12. The motor vehicle according to claim 1, wherein the projection module is attached in a region of an access door of the motor vehicle such that one or more of the partial graphics are generated in an opening region of the access door.

13. The motor vehicle according to claim 12, wherein a position of the partial graphics is not changed and/or shaded by an opening of the access door.

14. The motor vehicle according to claim 12, wherein the access door is a passenger entry door.

15. The motor vehicle according to claim 1, wherein the projection module is provided in a door sill of the motor vehicle.

16. The motor vehicle according to claim 15, wherein the projection module is provided at an installation position which is located in front of a passenger entry door in a longitudinal direction of the motor vehicle.

17. The motor vehicle according to claim 1, wherein the projection module is arranged in the motor vehicle such that an entirety of all of the partial graphics on one side of the motor vehicle extends essentially along a driver or front passenger entry door and an entry door for rear passengers located behind the driver or front passenger entry door.

18. A surroundings illumination device for a motor vehicle, wherein the surroundings illumination device is provided for illuminating a ground in surroundings of the motor vehicle, the surrounds illumination device comprising:
   a controller for controlling illumination of the ground, and
   a projection module, wherein:
      the projection module comprises a light device having a plurality of illuminants and an array made up of projection optical units, wherein a respective projection optical unit contains an associated object structure and an associated projection lens, so that upon illumination of the respective projection optical unit using the light device, the associated object structure is projected by way of the associated projection lens on the ground, and wherein there is a one-to-one correspondence between the object structures and the projection lenses of the projection optical units;
   the array made up of projection optical units is divided into multiple partial arrays, wherein each partial array contains a subset including a plurality of the projection optical units, and each partial array can be illuminated separately using an illuminant of the light device associated with the respective partial array, such that by way of the projection of the associated object structures of the projection optical units of the respective partial array, a partial graphic is generated on the ground in the surroundings of the motor vehicle, wherein the object structures of the projection optical units are identical within a respective partial array, such that each of the object structures within the respective partial array generates the same individual image, but the object structures of the projection optical units differ from one another between the partial arrays; and
   the controller is configured to operate the projection module for a predetermined time span in a dynamic operating mode, in which brightnesses of at least some illuminants of the plurality of illuminants are automatically varied based on a predetermined sequence pattern, wherein the predetermined sequence pattern, for each illuminant of the at least some illuminants, describes a chronological variation of its brightness and the chronological variations between at least two illuminants differ at least in sections in the predetermined time span.

\* \* \* \* \*